June 3, 1930. E. A. ROCKWELL 1,761,454
TIRE VALVE FOR INDICATING PRESSURES
Filed Feb. 25, 1925   3 Sheets-Sheet 2
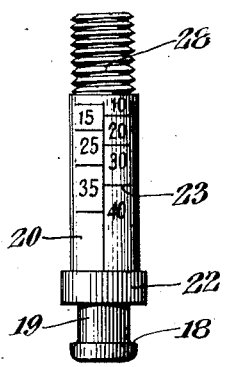
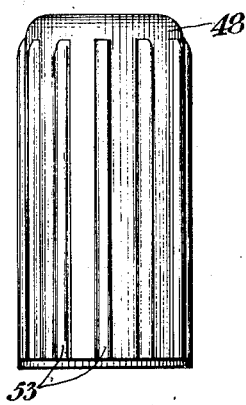
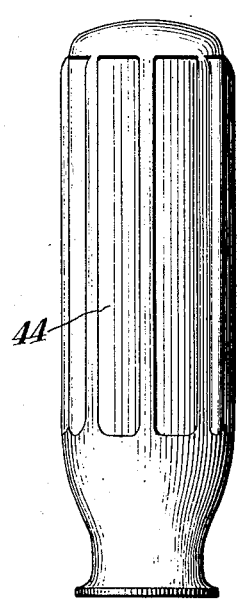
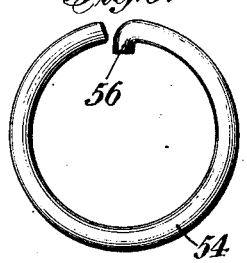
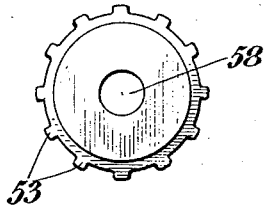
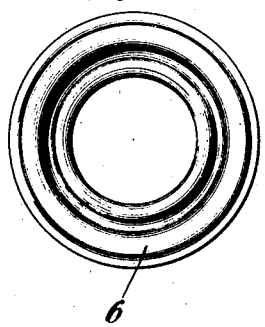
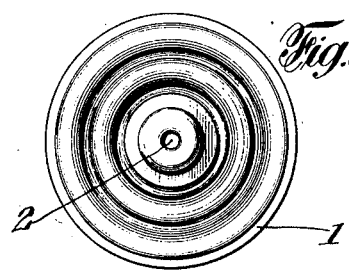
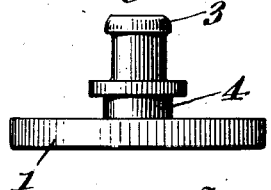
Inventor
Edward A. Rockwell
By his Attorneys
Prindle, Wright, Neal & Bean June 3, 1930.	E. A. ROCKWELL	1,761,454
TIRE VALVE FOR INDICATING PRESSURES
Filed Feb. 25, 1925    3 Sheets-Sheet 3
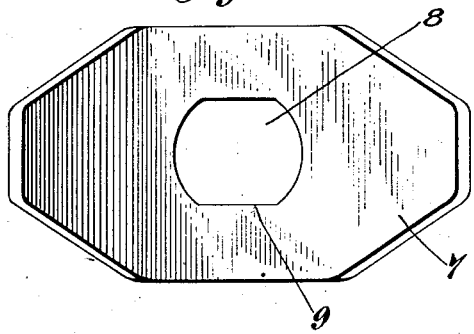
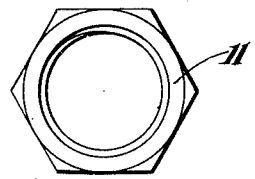
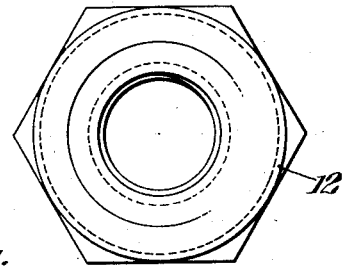
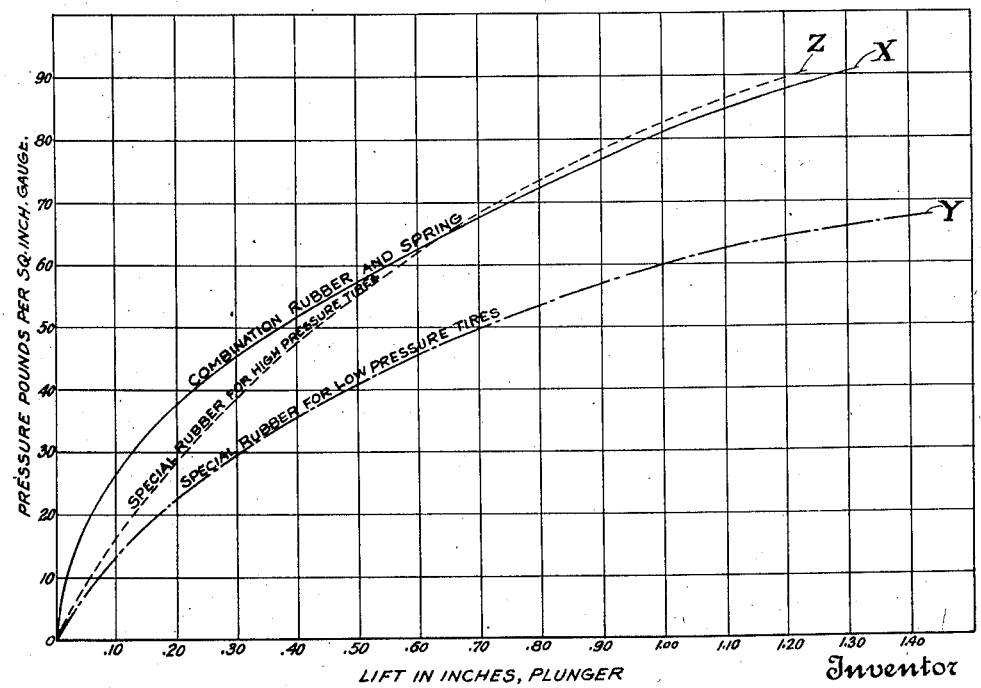

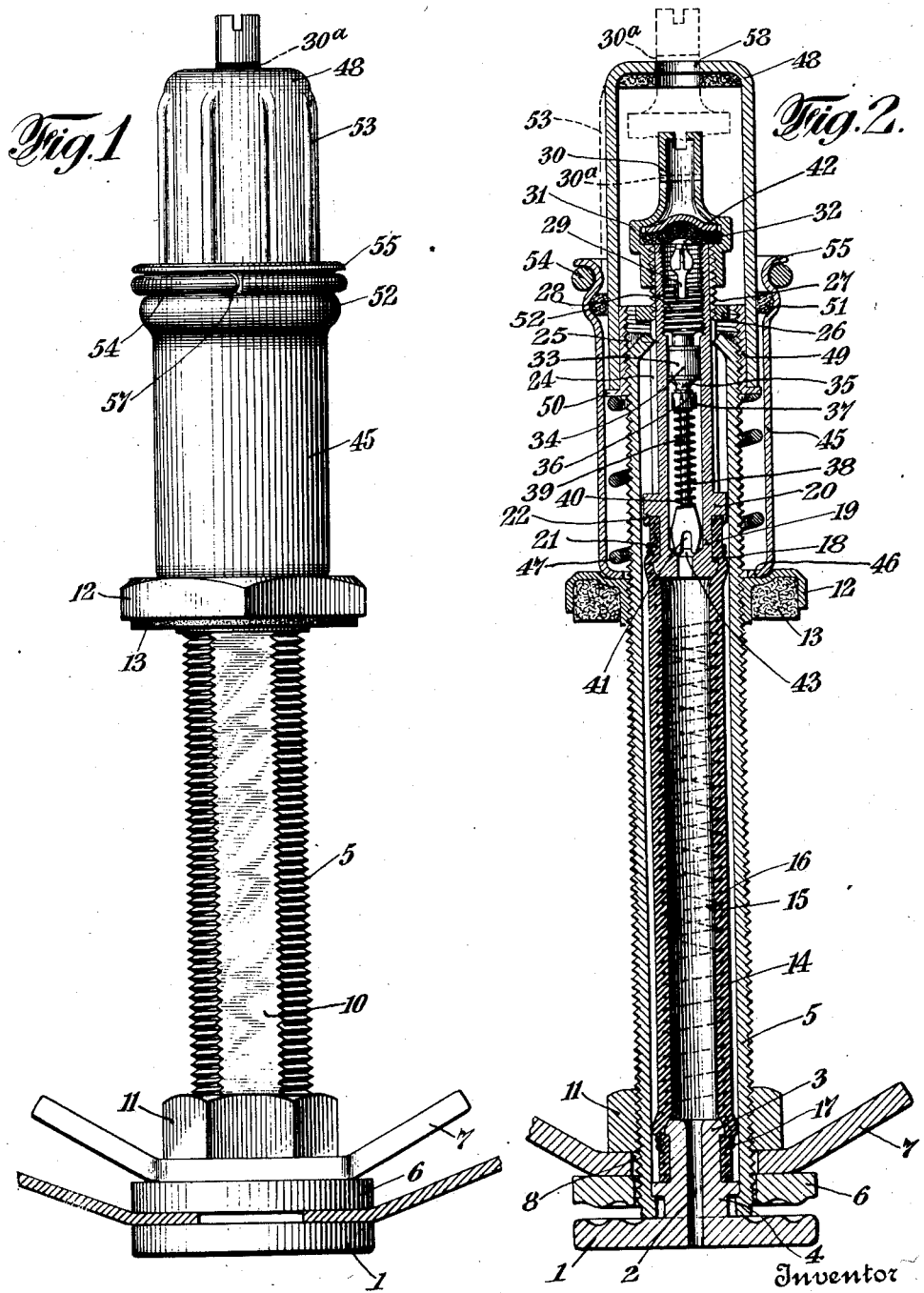

Patented June 3, 1930

1,761,454

UNITED STATES PATENT OFFICE

EDWARD A. ROCKWELL, OF NEW YORK, N. Y.

TIRE VALVE FOR INDICATING PRESSURES

Application filed February 25, 1925. Serial No. 11,392.

My invention relates to devices adapted to indicate pressures but has especial relation to the indication of pressures in tires of all kinds, as, for example, tires used on automotive vehicles.

The object of my invention is to provide a pressure indicating device having many advantages over previous constructions provided for this purpose. Previously, devices provided for this purpose have been impractical and ineffective for various reasons. In the prior constructions used for this purpose there has been such a large degree of inaccuracy as to render them difficult to operate or ineffective in producing the desired indication of the tire pressure. One class of devices previously designed for this purpose has operated upon the idea of utilizing a piston to move an indicator but these devices were ineffective owing to the impossibility of permanently maintaining a tight contact between the piston and the cylinder. Some of these devices have operated on the plan of throwing the piston indicator out of operation after the tire has been inflated, by applying a cap completely enclosing the movable parts so as to prevent the escape of any air during the movement of the vehicle but these have had the disadvantage that the indication of the pressure was not always accessible to be observed when desired. Another class of devices provided for this purpose has depended upon the use of an extensible rubber tube attached to an indicating scale, the rubber tube being confined by a spiral spring enclosing the same. These devices have had the advantage of having the indicated pressure available at all times but there have been inherent disadvantages in this type of indicating valve which have rendered them impractical for actual use as well as unduly expensive in manufacture. In the devices depending upon the use of an extensible rubber tube and a spring enclosing the same, owing to the presence of the spring, a tube of only very small diameter could be used in a tire valve of standard size, and the force obtainable by the extension of such a small tube is not sufficient to produce an accurate reading of the pressure in the tire owing to friction, etc., in that type of device. Furthermore, the constructions in those devices have been such as to permit of the use of only a comparatively short rubber tube. This has been mainly due to the fact that when the surrounding spring is extended the rubber tube acquires a larger diameter so that on the higher pressures there is a greater longitudinal extension than on the lower pressures, thus requiring the use of a very long scale to give the range of readings required and consequently a short rubber tube in the standard size tire valve. When a short tube has been used it has been found that the device is very inaccurate, especially as the rubber ages, owing to the approach of the elastic limit of the tube when the same is extended. Furthermore, devices in which such a spring has been used have had a large source of inaccuracy in indicating the pressures owing to the difficulty in manufacturing and assembling a spring with a fixed zero position. In those constructions where the calibrations at the high pressures are considerably farther apart than at the low pressures, any error in the zero position of the spring makes a very great difference in the resulting reading at the high pressures. In fact, at such high pressures such error might be four times as great as it would be if the calibrations were substantially the same distances apart and equal to the distances in the case of a low pressure reading. There is, furthermore, a great amount of inaccuracy in such devices owing to the fact that as the pressure is applied to the rubber tube there is a retarding action along the entire length of the rubber tube owing to the rubbing or friction of the tubing against the spring and owing to the fact, furthermore, that there is an angular movement of the spring over the rubber. Also, there are torsional forces in any such construction which materially affects the longitudinal movement of the indicating means, where the spiral spring is used.

These inaccuracies have the result of rendering the device ineffective for properly indicating the pressure in the tube inasmuch as it is possible to push in manually an indicator so mounted or to pull it out and have it remain in either of these positions showing an entirely erroneous reading on the scale. Also, by using a spring, provision has to be made to embody the same in the structure, which entails undue expense. It is the object of my invention to provide a structure in which these disadvantages are removed. Further objects of my invention will appear from the detailed description of the same hereinafter.

While my invention is capable of embodiment in many different forms for the purpose of illustration I have shown only certain forms of the same in the accompanying drawings, in which—

Figure 1 is a side elevation of a pressure indicating valve made in accordance with my invention;

Figure 2 is a vertical section of the same;

Figure 3 is a side elevation of a plunger carrying the indicating scale;

Figure 4 is an elevation of the removable dust cap;

Figure 5 is an underneath view of the same;

Figure 6 is a plan view of the snap ring used thereon;

Figure 7 is a side elevation of an ordinary dust cap which may be used with my device if desired;

Figure 8 is a plan view of the lowermost clamping device carrying a nipple for adjustment of the rubber tube thereto;

Figure 9 is an elevational view of the same;

Figure 10 is an underneath view of the washer which cooperates with the lowermost clamping device;

Figure 11 is a plan view of the bridge washer;

Figure 12 is a plan view of the nut cooperating therewith and which is designed to be located on the outside of the felloe;

Figure 13 is a plan view of the nut carried on the inside of the felloe; and

Figure 14 is a table showing pressure curves indicating the longitudinal extension at different pressures of a rubber tube surrounded by a spiral spring as compared with rubber tubes made in accordance with my invention.

It will be understood that my invention is applicable for use in indicating or utilizing pressures of any kind and is adapted to be used in connection with pneumatic tires of every description, including, for example, automobile tires of the standard type and adapted for using high pressures, or balloon tires which are designed to use the lower pressures. By way of example I shall describe in detail the construction as applied to low pressure of balloon tires. In carrying out my invention I make up a special rubber tubing. This may be made from sheet rubber having preferably a thickness of .025 inches and a width of 12 inches. This may be of any desired composition but by way of example may be comprised of—

100 parts of smoked sheet rubber,
35 parts of zinc oxide,
3 parts of sulfur,
.75 parts of a rubber accelerator to accelerate the vulcanization, such as diphenylguanidine.

I wind a layer of this sheet rubber on a mandrel having a diameter of $\frac{7}{32}$ of an inch with as small an amount of overlap as possible. Thereafter I wind around the rubber a No. 50 thread which has a diameter of .008 inches. The thread may be of cotton, silk, linen, wool or any other desired material, and is wound in such a way as to provide 16 windings of the same to an inch. The same size thread is then wound around the outside in the opposite direction with the same number of windings to the inch. Throughout the winding great care is taken to provide a uniform tension, a tension of ¼ oz. avoirdupois being preferred, in order to provide a uniform product and to not cut too deeply into the rubber. Thereupon I apply around the same another layer of rubber of the same thickness as the sheet rubber above referred to, preferably having the same composition, with a minimum overlap. The cloth is now tightly wound around the rubber and the latter is vulcanized in the usual way by the application of heat. The tube thus produced will have a thickness of approximately .05 inches. In case it is desired to make a tube designed for automobile tires of the usual type, using high pressure, the tube will be made in exactly the same way as above excepting that for the forward windings a thread having a diameter of .021 inches is used with a pitch of 20 to the inch, and for the rearward windings a thread having a diameter of .008 inches is used having the same pitch as the forward windings. The increased size of the winding gives the desired increased stiffness. This stiffness may also be obtained by decreasing the pitch with threads of the same size or of a smaller size, if desired. It is important to use as large a mandrel as possible to obtain the great directive force required. The resulting tube may be removed from the mandrel by removing the cloth and applying compressed air between the mandrel and the rubber tube so as to thus loosen the tube on the mandrel.

It has been found that the tubes constructed in this way have a substantially uniform extension for a given degree of pressure while at the same time the presence of the windings prevents any appreciable lateral enlargement of the tube. Furthermore, the presence of the windings in opposite directions prevents any torsional forces being developed in the tube when being extended by the air pressure. Also, by constructing the tube in this way a very much greater degree of extension is obtained at the initial low pressure so that the distances between the calibrations on the indicator in the tire valve for the pressures desired are very nearly the same. The very great difference between the action of a rubber tube of this kind as compared with a rubber tube surrounded by a spiral spring, is graphically shown in Figure 14 in which the curve X shows the degree of extension at different pressures of a rubber tube surrounded by a spiral spring; curve Y shows a similar curve for rubber tubes made in accordance with my invention for use in low pressure or balloon tires; and curve Z indicates the same data in the case of a rubber tube made in accordance with my invention for use on high pressure tires of the ordinary type. By an examination of these curves it will be readily seen that there is a vast difference between the results obtained by the use of tubes made in accordance with my invention as compared with the spiral spring and rubber tire construction. It will be seen therein that the amount of lift at 20 lbs. pressure is more than twice as great in the tubes made in accordance with my invention as in the case of the combined spiral spring and rubber tube construction. Consequently, a tube made in accordance with my invention will have a very much greater directive force, thus overcoming the disadvantages above referred to as present in previous constructions. The curves Y and Z, furthermore, are very nearly straight lines through the range of pressures used on the corresponding tires.

The remainder of the tire valve is also made in such a way as to assist in overcoming disadvantages present in prior constructions. For this purpose I have provided a lower clamping member 1, which may be a brass forging, having a central passageway 2 for the air and an upwardly directed nipple 3 through which the said passageway extends. Adjacent to the base of the nipple 3 there is an annular recess 4 to receive a screw-threaded tube 5 which may be of drawn brass tubing, and which is staked in at its lower edge so as to be fastened within the recess 4. Around the tube 5 at its lower end there is a clamping washer 6 and a bridge washer 7 having a central opening 8 with flat sides 9 to cooperate with flat sides 10 provided on the tube 5 in order to prevent the same from turning within the felloe of the wheel. Above the washer 7 there is carried a clamping nut 11. It will be noted that the nipple 3 is very short and, in fact, is located within and beneath the top of the nut 11 so as to permit the use of as great a length of rubber tubing as possible. Farther up on the tube 5 there is a clamping nut 12 provided with a felt packing 13 to prevent the entrance of dirt around the tube. I attach to the nipple 3 a length of rubber tubing 14 constructed as I have above described, with forwardly and rearwardly directed windings 15 and 16 of thread within the body of the same. The lower end of this tubing 14 is fastened on the nipple 3 by means of a wire 17 located around the same. At its upper end the rubber tubing 14 is carried in a recess 18, which extends inwardly and upwardly, on a nipple 19 forming a part of an indicating plunger 20. This end of the rubber tubing 14 is also secured in place, if desired, by means of a wire 21. The presence of the recess 18 prevents the upper end of the rubber tubing 14 from contacting with the inside of the tube 5 and thus eliminates what would otherwise be a source of friction in the movement of the plunger 20. The plunger 20, just above the nipple 19, has an annular flange 22, the purpose of which is to act as an external guide to space a scale 23 carried on the plunger 20 away from the inner wall of the tube 5, thus preventing any wear on the scale and making it possible to produce the scale by printing instead of by etching, a difference which is of very great importance in the manufacturing cost involved. Longitudinally along the sides of the portion of the plunger 20 carrying the scale 23 I have provided two grooves 24 which receive two corresponding staked-in portions 25 at the upper edge of the tube 5. These portions 25 not only prevent any angular movement of the plunger 20 with regard to the tube 5 but also act as stops, together with the flange 22 in the upward movement of the plunger 20, and also in the downward movement of the same with a ring 26 screw-threaded on to the top of the plunger 20.

The interior of the plunger 20 is, furthermore, provided with a screw-thread 27 to receive the "valve insides" of standard design. These are comprised of an exteriorly screw-threaded housing 28 fitting into the plunger 20 having two opposite recesses 29 at their upper edge to receive a spanner projection 30 of the usual kind but carrying a line of reference 30ª, carried by a cap 31 having one or more air-tight washers 32 therein. Said cap is adapted to be screw-threaded over the top of the plunger 20 above the "valve insides" to produce an air-tight joint in the usual way. The housing 28 is provided with an external annular washer 33 of rubber to make an air-tight joint and has, extending through the same, a longitudinal passageway 34 to permit the passage of air through the same. The lower end of said housing 28 beyond the washer 33 is provided with a valve seat 35 which carries a rubber washer 36 to make an air-tight joint, with an annular valve 37 supported by a spring 38 on a stem 39 which extends through said passageway 34 and which has at its lower end a bifurcated shell 40 supported by a flattened portion 41 on the stem 39. At its upper end the stem 39 also has a flattened portion 42 to limit the downward movement of the same. The shell 40, furthermore, is limited in its downward movement by an annular shoulder 43 located on the interior of the nipple 19. In other words, the "valve insides" extend all the way down to and within the nipple 19, said nipple being located at this high elevation in order to provide as great a length for the rubber tubing 14 as possible in a standard size tire valve.

Any desired kind of dust cap may be provided over the upper end of the tube 5, as, for example, the ordinary type of dust cap 44, which may be made of metal or any transparent material, as desired. Instead of the ordinary type of dust cap, however, I may use a form of dust cap which will enable the driver of the car to readily determine at a glance whether or not the tires have lost air without making it necessary to examine the numerical scale 23. This type of dust cap may be comprised of an outer shell 45 having at its lower end an inwardly directed flange 46 adapted to rest against the upper face of the nut 12, said flange having two flattened portions to fit against the flat sides 10 of the tube 5. This flange also forms a seat for receiving a spiral spring 47, the upper end of which contacts with the lower portion of an adjustable cover 48 which is made in the form of an inner shell 49 screw-threaded to the tube 5 and having an outwardly directed flange 50 against which the spring 47 rests. A packing of felt or other desired material 51 may be provided outside of the cover 48 and located within an annular recess 52 in the shell 45. The strip of felt 51 serves not only to prevent the entry of dust between the cover 48 and the shell 45, but to prevent these two parts from coming apart. Furthermore, in order to hold the cover 48 in any position to which it has been adjusted by rotation, said cover has a number of vertical flutes 53 which cooperate with a spring 54 carried in a recess 55 on the outside of the shell 45 and having an inwardly directed end 56 projecting through a hole 57 in the shell 45 so that said end 56 will contact with said flutes 53. In the top of the cover 48 there is located a hole 58 so that the spanner projection 30 on the cap 31 may project through the same.

In the operation of the valve indicator, when the tire is deflated, the rubber tubing 14 will be in its contracted position, that is to say that the scale 23, as indicated by the upper end of the tube 45, is in its lowermost position. In order to inflate the tire the dust cover, whether in the ordinary form such as the cover 44, or in the special form shown in Figure 1, will have been removed as well as the cap 31. Thereupon the source of air pressure is applied to the upper end of the plunger 20, thus causing the valve 37 to become unseated and admitting air to the interior of the tire through the tube 14. As the air increases in pressure within the tire the tube 14 will begin to extend in a longitudinal direction while retaining its diameter owing to the presence of the threads 15 and 16 therein. Owing to the fact that the threads are provided in opposite directions there will be no torsional movement of the tube 14. Furthermore, as the rubber tube is not forced against the inner wall of the tube 5 there will be no friction of any consequence between the rubber tube 14 and the tube 5. This is also insured by the upper end of the tube 14 being received in the upwardly and inwardly directed recess 18 on the nipple 19 which prevents the ends of the rubber tube becoming jammed in the tube 5. It will thus be found that the rubber tube 14 will extend very rapidly in a longitudinal direction even at the initial low pressures so as to give an effective reading on the scale 23 at such pressures. Also, this provides an equalization of the distances on the scale 23 so that there will be a substantially uniform movement of the scale 23 through the range of pressures required. Many advantages result from this, which have been previously pointed out in detail. The inflation of the tire is thus continued until the desired pressure is reached, as indicated by the reading of the upper end of the tube 5 on the scale 23. After having removed the source of air pressure the cap 31 is then applied and screwed on to the top of the plunger 20. If desired, the ordinary type of dust cap 44 may then be screwed over the top of the tube 5, or, instead, there may be applied the special form of dust cap as shown in Figure 1. In applying the special form of dust cap this will be applied over the tube 5 so that the flattened portions in the bottom of the shell 45 fit over the flattened portions 10 on the tube 5 and then the cover 48 is screwed down until the spanner projection 30 extends only slightly through the hole 58 in the top of the cover 48. The tires are now inflated, ready for use. The driver of the car, thus, may see at a glance at any time, whether or not his tires need air by looking to see whether or not the spanner projection 30 has been withdrawn below the top of the cover 48. This can be readily determined, also, even in a comparatively dim light or in the dark, as the driver, by the sense of touch, can determine whether or not the tires require air by feeling the top of the cover 48 to see whether or not the spanner projection 30 has been withdrawn beneath the top of the same, the position of the same, therefore, being tactually discernible. It will be noted, furthermore, that the length of the spanner projection 30 above the line 30ª, is substantially the same as the distance on the scale corresponding to the usable range of pressures below the normal required pressure.

While I have described my invention above in detail I wish it to be understood that many changes may be made therein without departing from the spirit of the same.

I claim:

1. A pressure indicating device comprising a movable indicating means having in operative relation thereto a tube made of material which is longitudinally extensible at a rate determined by said tube itself but which is substantially inextensible laterally, and means for connecting said tube to a pneumatic tire.

2. A pressure indicating device comprising a movable indicating means having in operative relation thereto a rubber tube made of material which is longitudinally extensible at a rate determined by said tube itself but which is substantially inextensible laterally, said tube containing a spiral winding of thread.

3. A pressure indicating device comprising a movable indicating means having in operative relation thereto a tube longitudinally extensible at a rate determined by said tube itself provided internally with means to prevent the transverse extension thereof and means for connecting the tube to a pneumatic tire.

4. A pressure indicating device comprising an indicating means, a longitudinally extensible tube adapted to operate the same from a pneumatic tire and a nipple connected to the indicating means for receiving one end of said tube, said nipple having an upwardly directed recess to receive the end of the tube.

In testimony that I claim the foregoing, I have hereunto set my hand this 24th day of February, 1925.

EDWARD A. ROCKWELL.